A. SUNDT.
TURNING LATHE.
APPLICATION FILED MAY 12, 1919.
1,341,946.
Patented June 1, 1920.
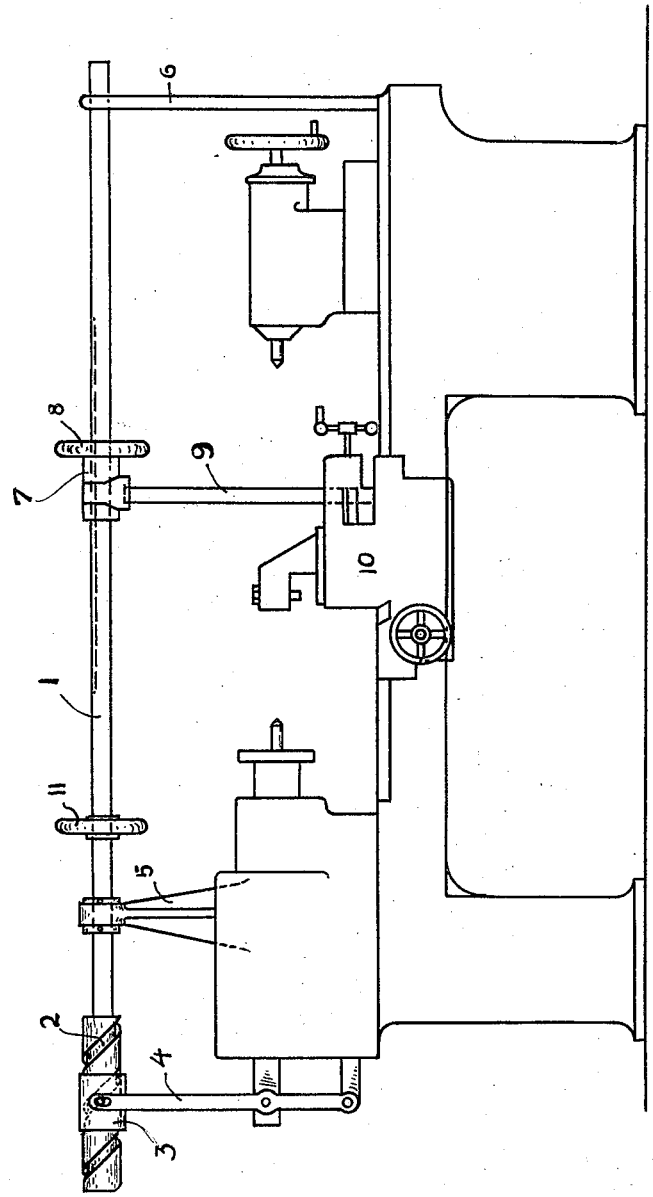

UNITED STATES PATENT OFFICE.

ANDREAS SUNDT, OF CHRISTIANIA, NORWAY, ASSIGNOR TO BRÖDRENE SUNDT, VAERKTÖIMASKINFABRIK A/S, OF CHRISTIANIA, NORWAY.

TURNING-LATHE.

1,341,946.      Specification of Letters Patent.      Patented June 1, 1920.

Application filed May 12, 1919. Serial No. 296,606.

*To all whom it may concern:*

Be it known that I, ANDREAS SUNDT, a subject of the King of Norway, of Lakkegaten 55, Christiania, in the Kingdom of Norway, have invented certain new and useful Improvements in Turning-Lathes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object a stopping and starting mechanism for turning lathes of the kind which is provided with a longitudinal controlling rod above the turning lathe.

According to the invention the control rod may be rotated by a wheel engaging the rod by means of a key and slot connection and being rotatably, but not slidably mounted in a bracket or column on the tool slide; whereby the operator has the stopping and starting mechanism always immediately in front of him.

On the drawing is illustrated a preferred form of the invention.

The control rod 1 is provided on one end with a screw or worm 2 engaging a nut 3 mounted on one end of a two-armed lever 4. The other arm of said lever serves to control a friction clutch for the driving mechanism of the lathe. By turning the controlling rod 1 the friction clutch is cut out or in. The controlling rod 1 is mounted in a bracket 5 on the head stock and in a column 6 at the opposite end of the lathe and between these points is provided with slidable sleeve 7 engaging the rod by means of a key and slot connection, said sleeve 7 carrying a hand wheel 8. Sleeve 7 is rotatably mounted in a column 9 in such a manner that it can not move axially with regard to the same, and so it will have to follow the movements of the tool slide 10. By turning wheel 8 the lathe may be started or stopped, and said wheel 8 always is directly in front of the operator. Besides wheel 8 the rod may also be provided with a fixed wheel 11 near the head stock.

I claim:

In a turning lathe, the combination with a tool slide, a head stock, and a clutch operating lever mounted on the latter, of a stationary bracket mounted on the head stock, a column carried by the tool slide, a sleeve rotatably mounted in the column, a controlling rod journaled in the bracket and sleeve and rotatable with the latter, a nut carried by the free end of said operating lever, a worm fixed on the controlling rod engaging the nut, and means to rotate the sleeve whereby the operating lever is actuated.

In testimony that I claim the foregoing as my invention, I have signed my name in presence of two subscribing witnesses.

ANDREAS SUNDT.

Witnesses:
    MOGUN BRIGGS,
    OLGA MÜLLER.